(12) United States Patent
Brew et al.

(10) Patent No.: US 6,314,428 B1
(45) Date of Patent: Nov. 6, 2001

(54) METHOD AND APPARATUS FOR APPLICATION MANAGEMENT IN COMPUTER NETWORKS

(75) Inventors: Glenn Edwards Brew; Steven Michael French; Chakkalamattam Jos Paul; Julie Hong-Van Tran, all of Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/140,375

(22) Filed: Aug. 26, 1998

(51) Int. Cl.$^7$ ................................. G06F 7/00; G06F 9/00
(52) U.S. Cl. ........................ 707/103; 707/104; 709/302
(58) Field of Search .................................. 709/223, 249, 709/302; 707/104, 103

(56) References Cited

U.S. PATENT DOCUMENTS

| | | | |
|---|---|---|---|
| 5,228,137 | * 7/1993 | Kleinerman et al. | 395/500 |
| 5,642,515 | * 6/1997 | Jones et al. | 710/220 |
| 5,734,871 | * 3/1998 | Kleinerman et al. | 709/302 |
| 5,752,027 | * 5/1998 | Familiar | 707/103 |
| 5,828,842 | * 10/1998 | Sugauchi et al. | 709/223 |
| 6,052,685 | * 4/2000 | Eastwick et al. | 707/10 |

OTHER PUBLICATIONS

Workspace On–Demand Handbook, IBM International Technical Support Organization—Austin Center, Nov. 1997.

* cited by examiner

*Primary Examiner*—Krisna Lim
(74) *Attorney, Agent, or Firm*—Barry S. Newberger; Winstead Sechrest & Minick P.C.; Jeffrey S. LaBaw (57) ABSTRACT

A method and apparatus for application management in a multiuser networked data processing environment are implemented. An application definition is generated for each application available to users on the network. Each application definition includes a plurality of application parameters, the values of which may be set by a system administrator. Application definitions are stored in a database on a domain controller. A subset of application parameters are user overridable. Each application definition may be associated with at least one user by a system administrator, whereby the corresponding application is made available to each such user. User overridable parameters may be assigned user specific values, which may be different for each user associated with the application definition. These are also stored in the domain controller database with the user associations. At a user logon on a client processor, the portion of the domain controller database corresponding to the user is retrieved by a desktop builder, and a local copy generated on the client processor. Using the local copy of the application definitions associated with the user, the desktop builder presents to the user a representation of each application associated with the user. The user may access each application thereby, wherein a desktop and each application are customized for the user.

42 Claims, 7 Drawing Sheets

METHOD AND APPARATUS FOR APPLICATION MANAGEMENT IN COMPUTER NETWORKS

TECHNICAL FIELD

The present invention relates in general to network computers, and in particular, to the management of applications in a network environment in which users can "roam" from networked computer to networked computer.

BACKGROUND INFORMATION

A typical network computing environment includes multiple personal computers or workstations (collectively, client processors) coupled to a network and one or more resource servers which store and provide resources to the client data processor. Additionally, a dedicated processor, a domain controller, provides administrative and management services to the network. The resource servers store applications and data which are used on the client processors on the network in accordance with the requirements of the users of the respective client processors. A particular user may be associated with a corresponding client on the network, for example, a personal computer on the user's desk. Further associated with the user, may be a suite of applications which the user requires in performing his or her day-to-day tasks. These applications, which are provided to the user via the network, by the resource server, may appear on the user's computer display as an iconized representation. These applications may be customized according to the particular user's needs.

In such a prior art network, the client processors are locally configured. Thus, the appearance of the desktop presented to the user after logon, corresponds to the configuration appropriate to the particular user associated with a client processor. Thus, in an environment where users "roam," that is, find it necessary to access applications from a client processor other than their own, such users may not have the necessary applications available to them. Then, a network administrator must locally reconfigure each client processor from which the roaming user accesses the network. Therefore, there is a need in the art for methods and apparatus which enables domain controller based configuration of networked client processors. There is additionally a need in the art for such controller based configuration methods and apparatus wherein roaming users are presented with their individual desktop representations at every networked client processor from which they may access the network.

SUMMARY OF THE INVENTION

The aforementioned needs are addressed by the present invention. Accordingly, there is provided, in a first form, a method of applications management including the step of creating an application definition for a multi-user application, and associating the application definition with one or more users. In response to each logon by the user, building a desktop workspace corresponding to the user, the desktop workspace including a representation of the multi-user application.

There is also provided, in a second form, a data processing system for applications management. The data processing system includes a domain controller operable for coupling to a network, wherein the domain controller includes circuitry operable for creating an application definition for a multi-user application, and circuitry operable for associating the application definition with one or more users. The data processing system also includes at least one client processor coupled to the network, the at least one client processor including circuitry for building a desktop workspace corresponding to the user in response to each logon by the user, the desktop workspace including a representation of the multi-user application.

Additionally, there is also provided, in a third form, a computer program product operable for storage on computer readable media, the program product for applications management including programming operable for creating an application definition for a multi-user application, and programming operable for associating the application definition with one or more users. The computer program product also has programming for building a desktop workspace corresponding to the user in response to each logon by the user, the desktop workspace including a representation of the multi-user application.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

The present invention implements methods and apparatus for applications management in a networked data processing environment. A system administrator may generate an application definition which associates a particular application software program available to multiple users on the network with a set of parameters used by the application when it is launched by a user. The parameter set in the application definition establishes default parameter values for the associated application. A particular application may be associated with a user in the multiuser environment by associating the user with the application definition corresponding to the particular application. In associating the user and the application definition, the application may be customized for the user by overriding the default parameter values with parameter values that are user-specific for the user. The application definition and the parameter values corresponding to any particular user are stored in a data base. A user may logon to any client processor on the network, and, at logon, the portion of the database corresponding to application definitions associated with the user is copied on the client processor. In this way, a suite of applications associated with a particular user, and customized for that user, are thereby available to the user from any client processor.

In the following description, numerous specific details are set forth to provide a thorough understanding of the present invention. However, it will be obvious to those skilled in the art that the present invention may be practiced without such specific details. In other instances, well-known circuits have been shown in block diagram form in order not to obscure the present invention in unnecessary detail.

Refer now to the drawings wherein depicted elements are not necessarily shown to scale and wherein like or similar elements are designated by the same reference numeral through the several views.

Figure 1:
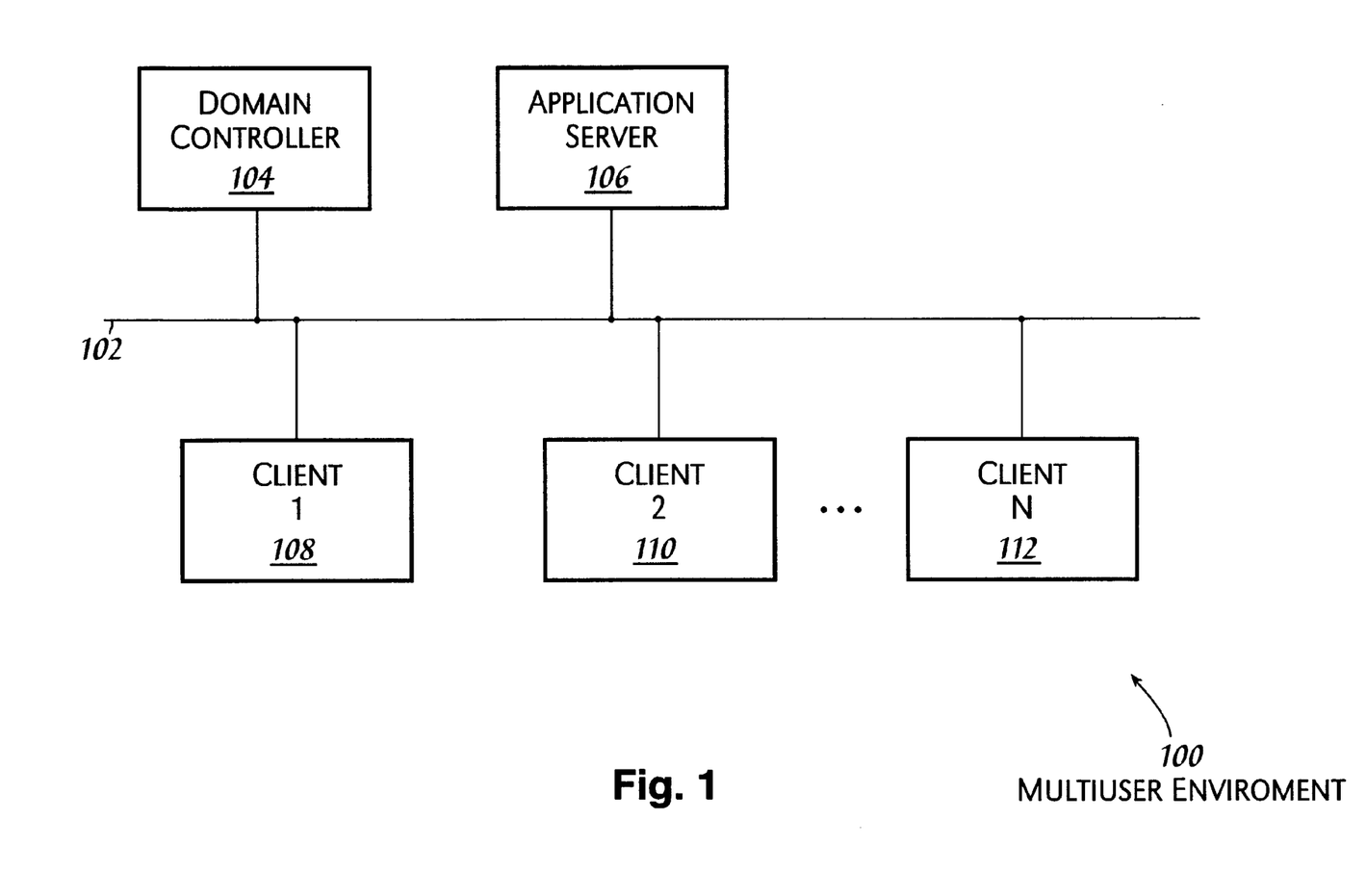
FIG. 1 illustrates, in block diagram form, a multiuser network processing environment in accordance with an embodiment of the present invention.
Figure 3A:
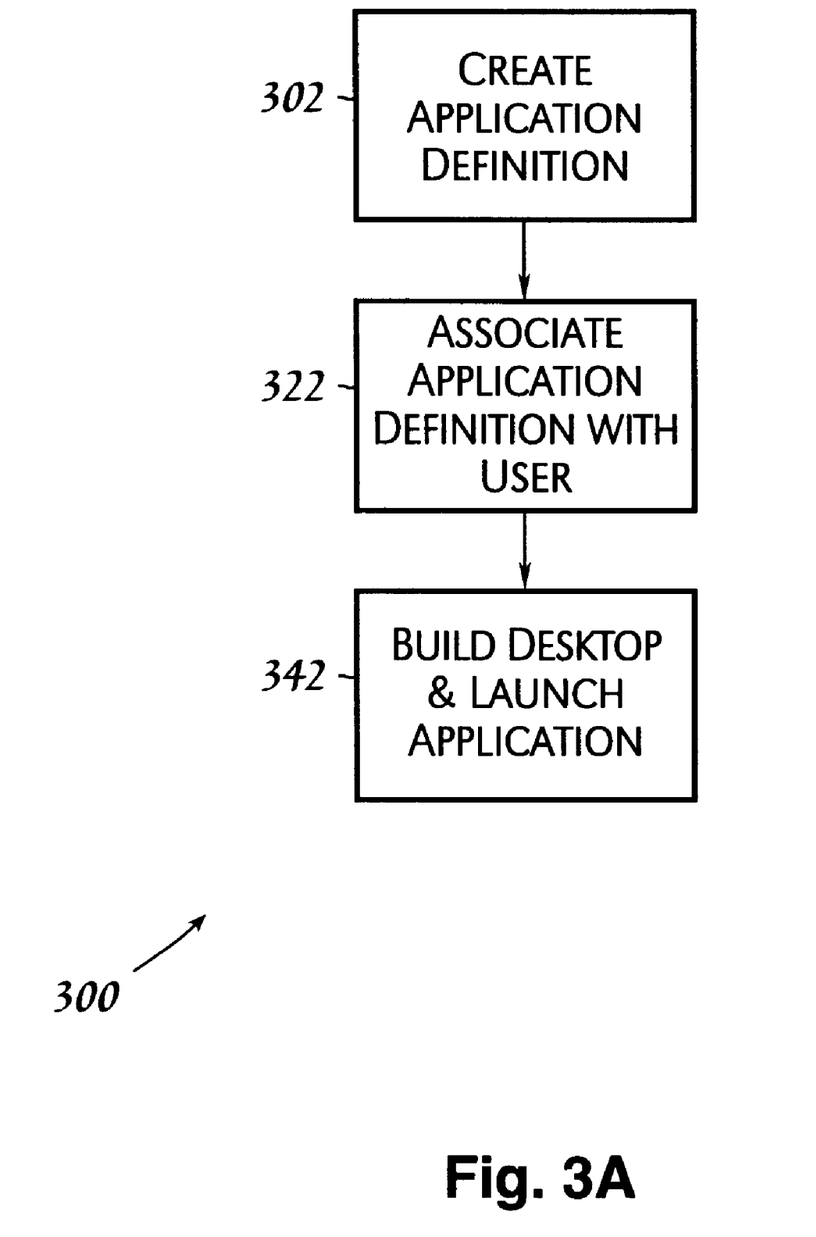
FIG. 3A illustrates, in flowchart form, a method of application management in accordance with an embodiment of the present invention.

Refer first to FIG. 1 illustrating multiuser networked data processing environment 100 which may be used for the present invention. Multiuser networked data processing environment 100 includes network 102 to which a plurality of data processing devices are connected. Domain controller 104 provides network management and administration services to network 102. Application server 106 stores the application software files and any application data files that may be associated therewith. Application server 106 provides those applications and data associated with a particular user to the user when launched by the user. The applications associated with the user are made available at logon. The mechanism by which an application is made available to a user will be described further in conjunction with FIG. 3. Multiuser network data processing environment 100 also includes N (one or more) client processors, client 1 108, client 2 110 through client N 112. A user in multiuser networked data processing environment 100 may logon to any one of client 1 108 through client N 112, and access applications in his associated suite of applications, according to the principles of the present invention. Moreover, the suite of applications as represented to the user in, for example, a graphical user interface (GUI) may be identical in appearance independent of which of client 1 108 through client N 112 is being used by the user.

It would be understood that multiuser networked data processing environment 100 may include additional components not essential for the practice of the present invention. For example, multiuser environment 100 may include backup domain controllers attached to network 102. Backup application servers may also be included on network 102. It would be understood, additionally, that in an embodiment of multiuser environment 100 having such backup facilities, the backup facilities would incorporate the methods and apparatus of the present invention.

Figure 2A:
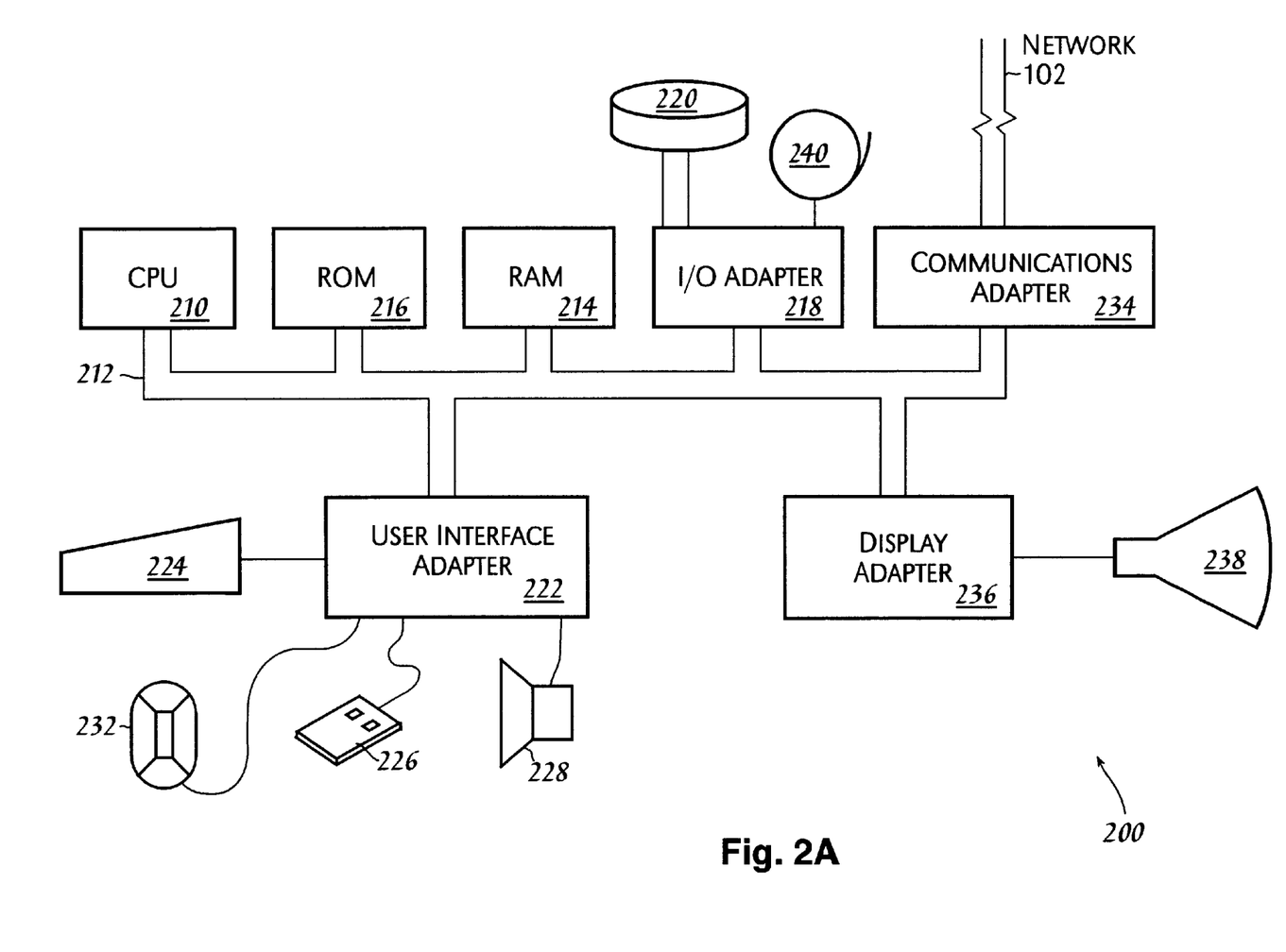
FIG. 2A illustrates, in block diagram form, a data processor in accordance with an embodiment of the present invention.

A representative hardware environment for practicing the present invention is depicted in FIG. 2A, which illustrates a typical hardware configuration of data processor 200 in accordance with the subject invention having central processing unit (CPU) 210, such as a conventional microprocessor, and a number of other units interconnected via system bus 212. Data processor 200 may embody domain controller 104. It may, alternatively, embody application server 106 or a client, such as clients 108–112. In each alternative embodiment, the specific embodiment is engendered by the operation of software implemented on processor 200. Data processor 200 includes random access memory (RAM) 214, read only memory (ROM) 216, and input/output (I/O) adapter 218 for connecting peripheral devices such as disk units 220 and tape drives 240 to bus 212, user interface adapter 222 for connecting keyboard 224, mouse 226, and/or other user interface devices such as a touch screen device (not shown) to bus 212, communication adapter 234 for connecting data processor 200 to data processing network 102, and display adapter 236 for connecting bus 212 to display device 238. Software may be stored in non-volatile storage devices, such as disk units 220 and copied into RAM 214 for execution. Portions of software may also be included in ROM 216. CPU 210 may include other circuitry not shown herein, which will include circuitry commonly found within a microprocessor, e.g., execution unit, bus interface unit, arithmetic logic unit, etc. CPU 210 may also reside on a single integrated circuit.

Figure 2B:
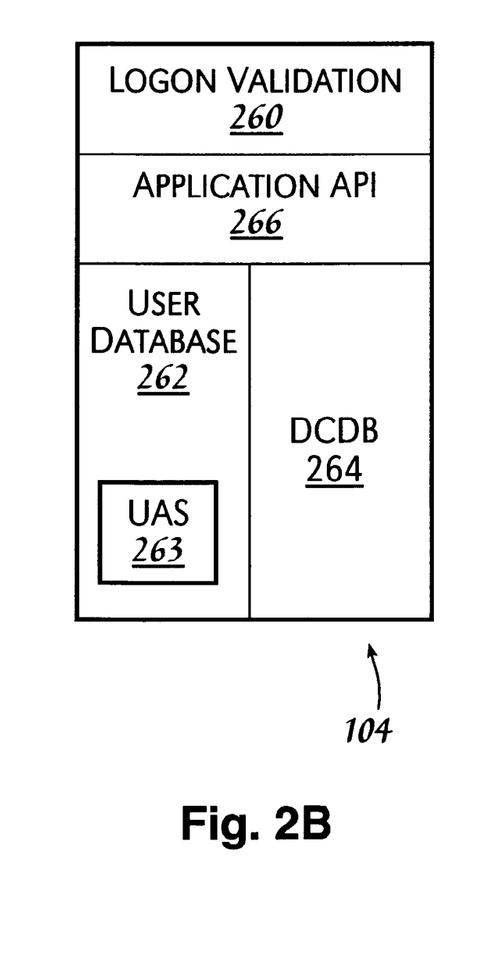
FIG. 2B illustrates, in block diagram form, a domain controller in accordance with an embodiment of the present invention.

Refer now to FIG. 2B in which is illustrated a component diagram for domain controller 104 in accordance with the present invention. Domain controller 104 includes logon validation circuitry 260 to verify the logon of a user logging on to one of client 1 108 through client N 112. Such logon validation circuitry is known in the art and will not be discussed in detail herein. Domain controller 104 also includes user database 262 which contains information associated with authorized users in multiuser environment 100. Within user database 262 is user accounts subsystem (UAS) 263 which contains user account and password information. The application definitions are stored in domain controller database (DCDB) 264. In this way, security related information is separated from shared resources. However, it would be understood by one of ordinary skill in the art that other configurations of resources would fall within the spirit and scope of the present invention. Entries into DCDB 264 are generated via application definition applications programming interface (API) 266. UAS 263 is used by logon validation circuitry 260 to validate a user logon onto one of clients 108–112. DCDB 264 and application definition API 266 will be discussed further in conjunction with FIG. 3.

Figure 2C:
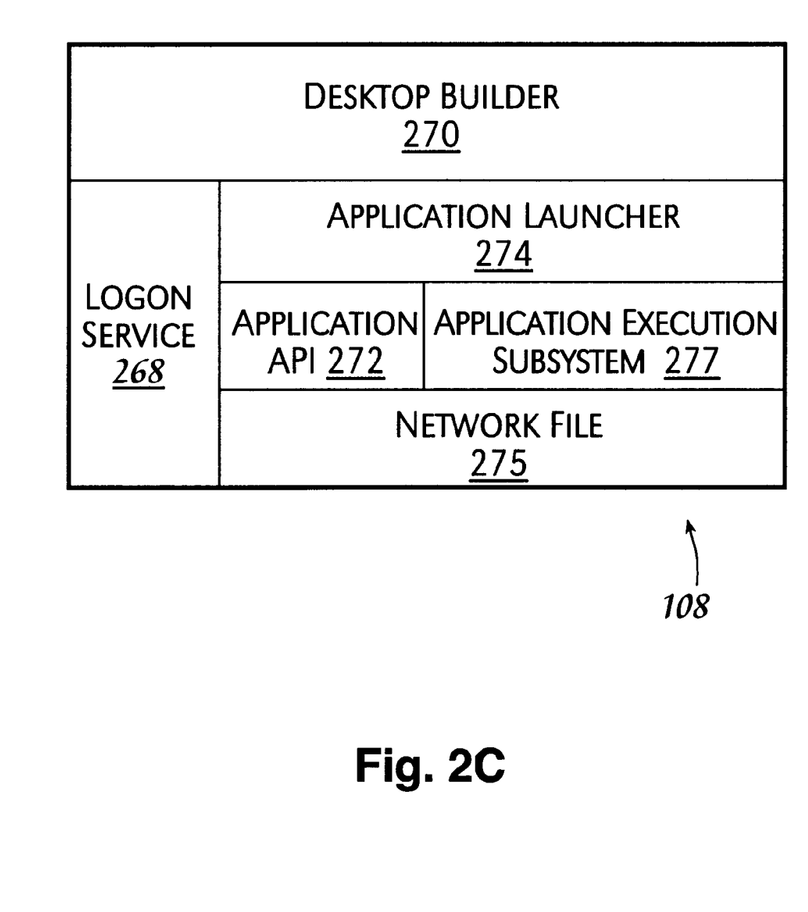
FIG. 2C illustrates, in block diagram form, a client processor in accordance with an embodiment of the present invention.

FIG. 2C illustrates a component diagram of client 1 108. It would be understood, that the other clients in multiuser environment 100, such as client 2 110 through client N 112 would include similar components. Logon server circuitry 268 handles logon of users and forwards logon data to domain controller 104. Logon service 268 also invokes desktop builder 270.

Desktop builder 270 queries DCDB 264 for the application definitions associated with the user logging onto client 1 108. The interface between desktop builder 270 and DCDB 264 is formed via application API 272 in client 1 108 and application API 266 in domain controller 104. Application (APP) launcher 274 retrieves an application from application server 106, communication across the network being handled by network file system 275, and invokes the application. The application is run by application execution subsystem 277. In accordance with the principles of the present invention, user-specific application parameters are provided to the application, whereby the application is customized for the user independent of the particular client and by the user. This will be further described below.

The operation of the components of domain controller 104 and a representative client, such as client 1 108, may be further understood by referring now to FIG. 3A in which is illustrated a flowchart of method 300 for application management in multiuser environment 100, according to the present invention. Method 300 creates an application definition in step 302. Application definitions are created in response to system administrator entries on domain controller 104 (or remotely to domain controller 104 from an administrative workstation, which may, in an embodiment of the present invention, be a preselected one of clients 108–112) and stored in DCDB 264 via the invocation of application definition API 266. Application parameter values can be created and associated with application definition and associated with the corresponding application through the application definition.

In step 322, the application definition created in step 302 is associated with a particular user. The association of an application definition with a user is also in response to inputs by a system administrator on domain controller 104 (or remotely to domain controller 104 from an administrative workstation). In an embodiment of the present invention, data entries by a system administrator to create an application definition and to create a user association therewith may be implemented through a GUI. Alternatively, in another embodiment of the present invention, data entries in order to create application definitions and user associations therewith may be input via a command line interface (CLI). In step 342, the desktop is built on a client, such as one of client 1 108 through client N 112. The desktop is built by invoking desktop builder 270 by logon service 268. Also in step 342, an application associated with the user may be launched by invoking APP launcher 274.

Figure 3B:
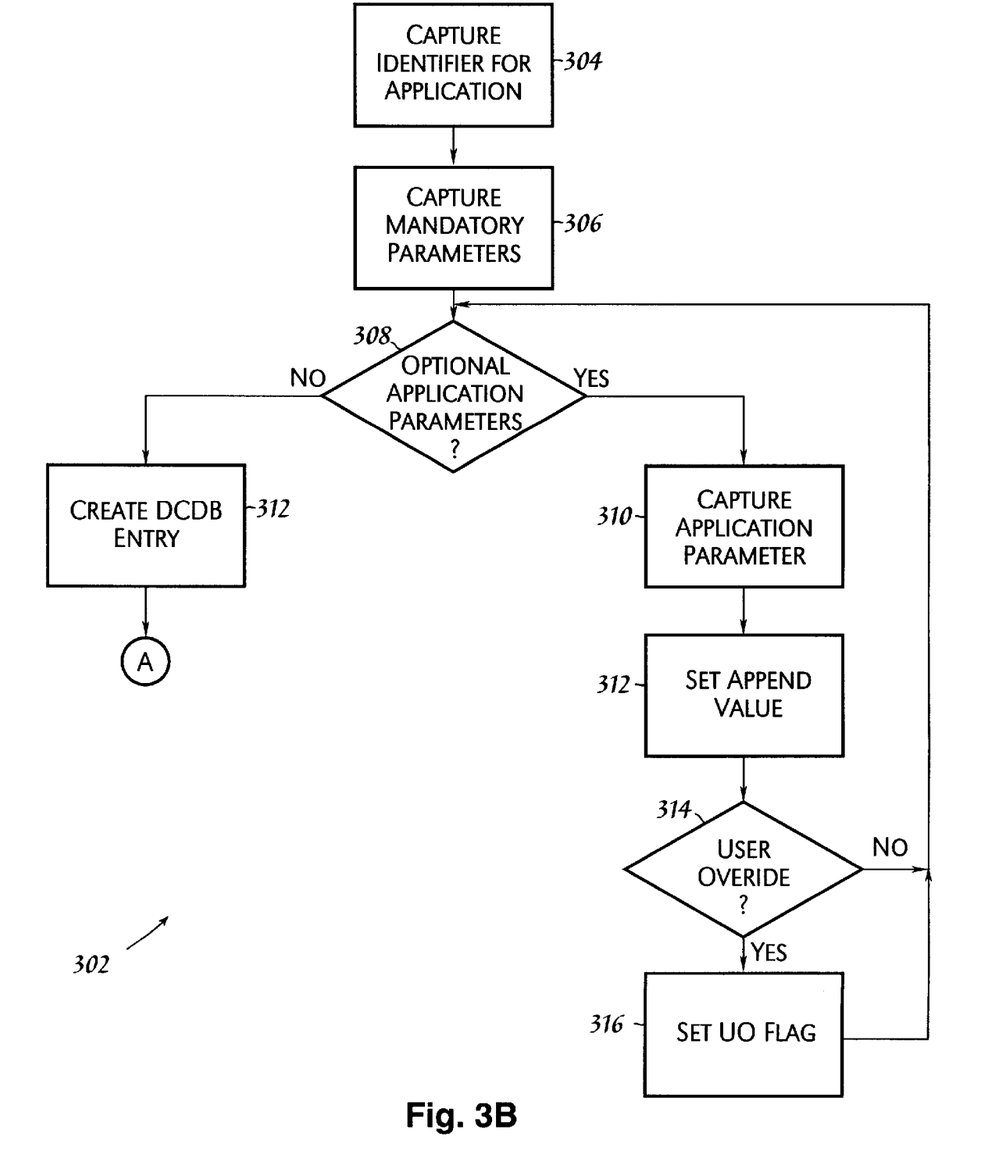
FIG. 3B illustrates, in flowchart form, an application definition creation method in accordance with an embodiment of the present invention.

Application definition creation in step 302 may be further understood by referring now to FIG. 3B illustrating step 302 in further detail. In step 304, an identifier for the application associated with the application definition being created in step 302 is captured. The identifier may be provided via system administrator input in response to a graphical presentation on a GUI. Alternatively, the identifier in step 304 may be entered via a CLI. In step 306, mandatory parameters associated with the application are captured. These may include the name of the application and its location. The location specifies where the application is to be found within environment 100, and in particular, its location on application server 106. Mandatory parameters may also include the application type, such as a full screen application or a windowed application.

If, in step 308, application specific optional parameters are to be added, method 302 continues, in step 310, to capture the application specific parameter. Application specific parameters may include remarks or comments which may, for example, be used to provide a mnemonic description of the application when the application has a cryptic name. Additionally, optional parameters may include invocation parameters which are applied to select features in the application when the application is invoked, path names to data (DPATH), path names to dynamically linked libraries (LIBPATH), environmental (ENV) variables, and configuration (INI) values. Configuration values may also, in an embodiment of the present invention, be referred to as system registry values.

Additionally, in an embodiment of the present invention directed to the OS/2 operating system (OS/2® is a multitasking operating system for personal computers; OS/2 Warp 4 is copyright by International Business Machines, 1996), application parameters may represent environment variables corresponding to a complete set of OS/2 "DOS settings" and "Win-OS/2" settings. (Win-OS/2® is the OS/2 emulation of Windows™ 3.1; Win-OS/2® is a trademark of International Business Machines; Windows™ is a trademark of Microsoft Corporation.) For example, for DOS applications, the "DOS version," INT_DURING_IO" and "DPMI_MEMORY_LIMIT" as well as other parameters, well-known in the art could be set to alter the run time behavior of the DOS application. Similarly, for Windows applications, the Win-OS/2 "WIN_RUN_MODE", and other parameters known in the art, could be set, allowing the application execution environment to be tuned specifically to the simulate Windows 3.1 Enhanced Mode for those applications requiring it. (As is known in the art, Windows™ 3.1 Enhanced Mode allows improved accessability to upper memory, but may unnecessarily slow down applications not otherwise requiring it.) Other settings are used to tune application performance and adjust, at execution time, the multimedia configuration, and which device drivers are dynamically loaded by the application execution environment when this application is instantiated.

Application parameters may also include those that control windowing behavior and icons representing the application. Window behavior control of the instantiated application may, for example, prevent an application from being closed when started, or force the application to always launch minimized or cause the application to be launched using the full screen rather than the smaller window on the desktop. Application parameters also may alter the icon that represents the application on the client's desktop, its position on the desktop, and any nesting within folders on the desktop.

It would be understood, however, that the present invention is not limited to the specific types of application parameters described hereinabove. Other embodiments of application parameters would be understood to come within the spirit and scope of the present invention.

The format of an application parameter consists of the parameter name and the value to be assigned to the parameter. A tag, or append value, may also be set. The append value indicates whether a particular parameter value is to be appended at the end of a current value, prepended to the front of a current value, or if the parameter value is to replace the current parameter value. In step 312 of application definition step 302, a preselected append value is set.

The parameter value set in steps 310 and 312 is a system-wide parameter value. That is, it is the value that the parameter takes whenever the associated application is accessed. However, a subset of parameter values may be allowed to be overwritten by a user whereby a user specific parameter value would be associated with the application. If, in step 314, the parameter value set in step 310 may be overridden by a user, in step 316 a user override (UO) flag is set. Otherwise, in step 314, application definition creation in step 302, returns to step 308 to set a next optional application parameter. If no other application parameters are to be set, a DCDB entry is created in step 312. The DCDB entry is created via application API 266 in domain controller 104.

Figure 3C:
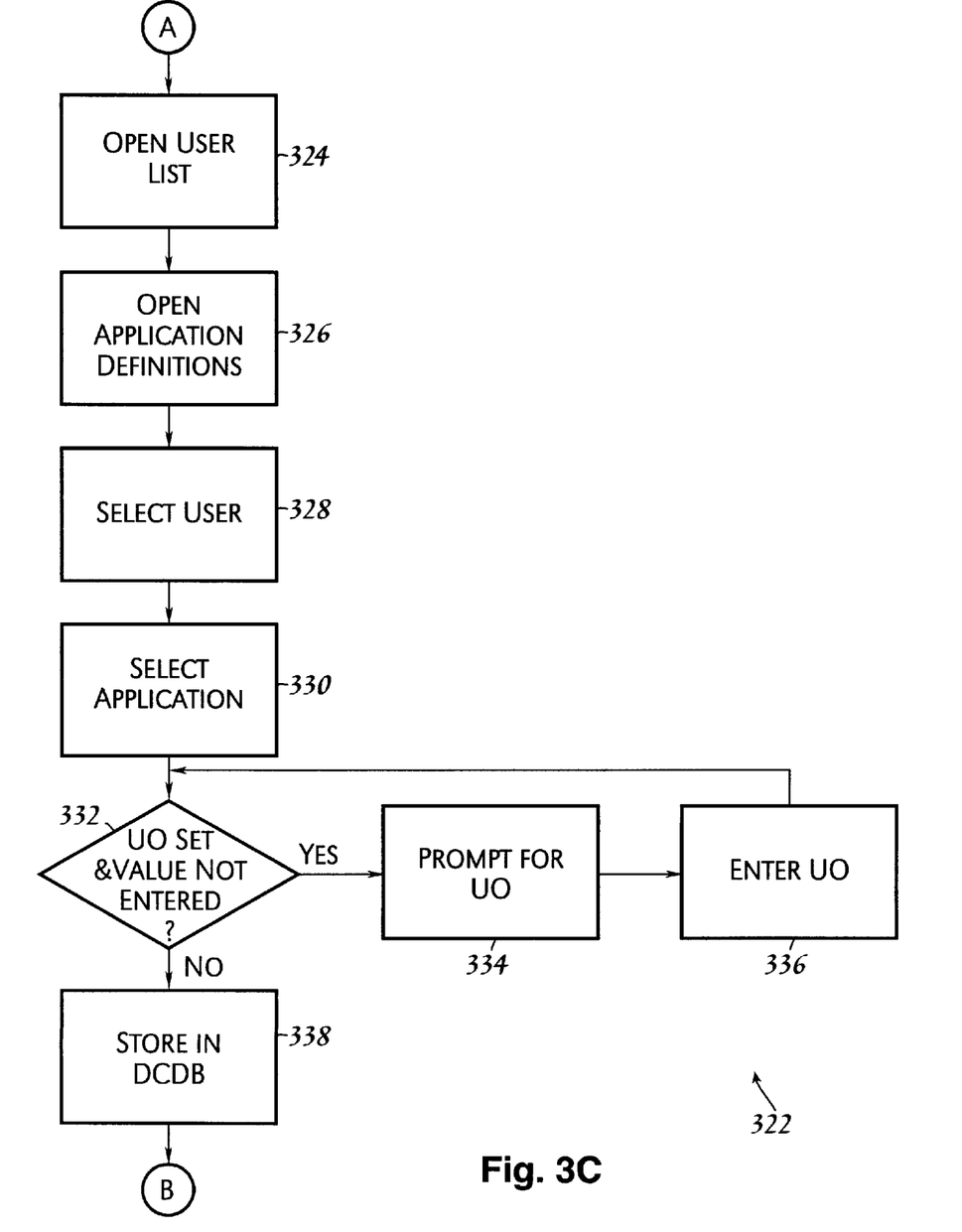
FIG. 3C illustrates, in flowchart form, a user association method in accordance with an embodiment of the present invention.

A user is granted access to an application by associating the application definition created in step 302 with the user. Association of the application definition with a user may be further understood by referring to FIG. 3C illustrating, in detail, step 322 of FIG. 3A. In step 324, a user list in user database 262 is opened. In step 324, a list of application definitions, maintained in DCDB 264 is opened. A user is selected in step 328, and in step 330, an application definition corresponding to the application with which the user is to be associated is selected.

If, in step 332, the application definition in step 330 has a UO flag set for a user overridable parameter, and a value has not been entered, in step 334 a prompt for a user override value is output. The user override value is captured in step 336 in response to system administrator input. Association step 322 then continues by returning to step 332. If, in step 332, all user overridable parameter values have been entered, association step 322 then continues, in step 338, by storing the user override values set in step 336, and the user selected in step 328 in DCDB 264 in the entry therein corresponding to the application definition selected in step 330. Storing of the data in DCDB 264 in step 338 is effected via application API 266.

Figure 3D:
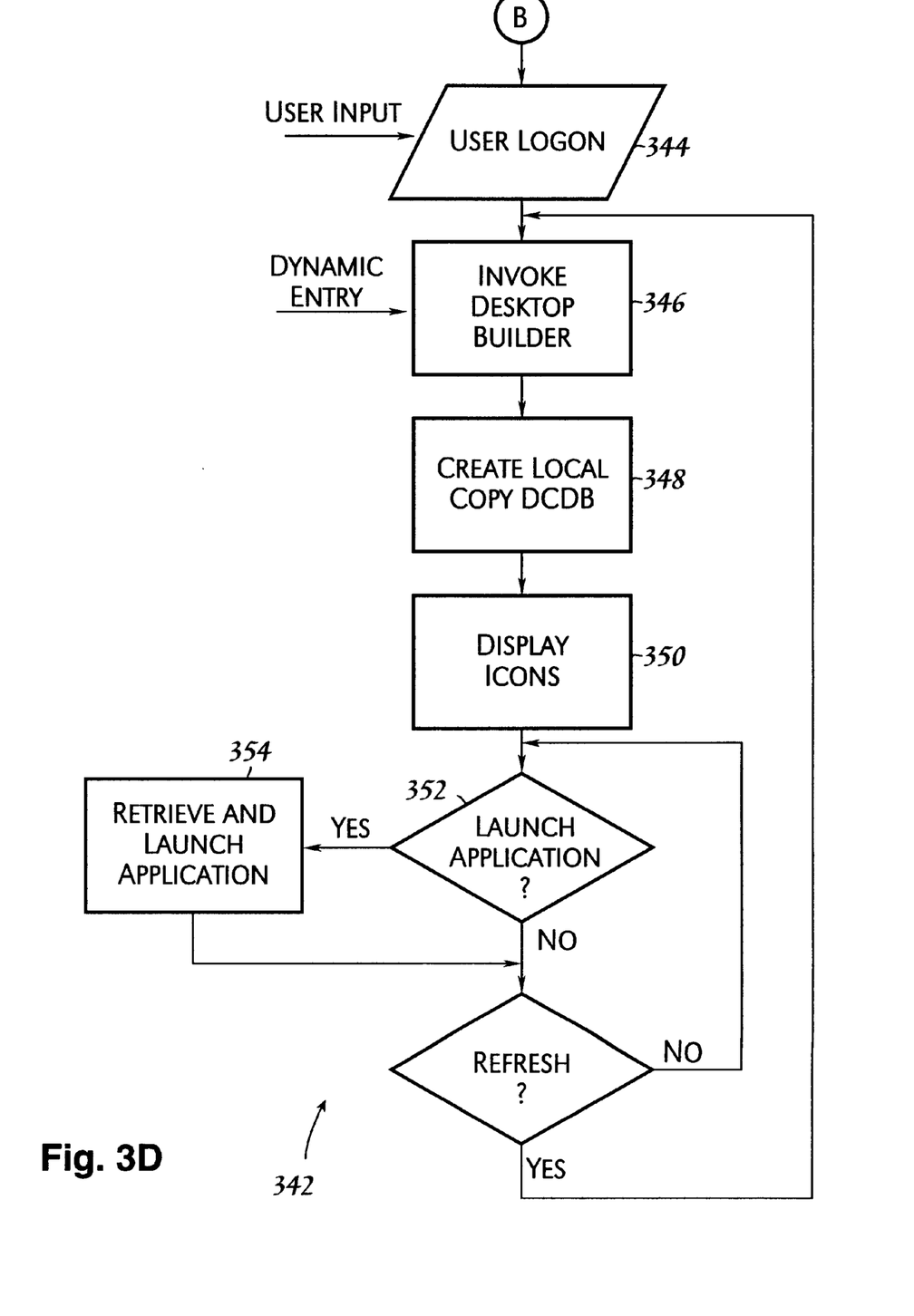
FIG. 3D illustrates, in flowchart form, a desktop build method in accordance with an embodiment of the present invention.

The desktop build, step 342, is illustrated in further detail in FIG. 3D. In step 344, a user logs on to one of client processors client 1 108 through client N 112. User logon, in step 344, is handled by logon service circuitry 268 in the client processor, such as client 1 108 illustrated in FIG. 2C. In response to the user logon, logon validation circuitry 260 in domain controller 104 verifies the user with user security information in UAS 263. Logon service circuitry 268 then launches desktop builder 270, in step 346. In one embodiment of the present invention, a desktop may be rebuilt dynamically wherein desktop builder 270 may be invoked remotely in response to signals from domain controller 104. In this way, software updates may be managed globally for multiuser networked data processing environment 100.

In step 348, desktop builder 270 creates a local copy of a portion of DCDB 264 corresponding to the particular user logged on in step 344. Retrieval from DCDB 264 is mediated via application API 272 on the respective one of clients 108–113, and application API 266 on domain controller 104. In step 350, representations of the applications associated with the user are displayed. In an embodiment of the present invention in which a client processors use a GUI, these representations may be "icons," in accordance with well-known techniques in the art.

In step 352, if an application is launched, in step 354, APP launcher 274 obtains the application definition from the local copy of DCDB 264 stored in step 348, retrieves the application from application server 106, configures the runtime environment corresponding to this instance of the application, and invokes the application. The application is executed by application execution subsystem 277. In an alternative embodiment, APP launcher 274 retrieves application definition data from DCDB 264 directly and dynamically configures the runtime environment corresponding to this instance of the application according to the application parameters in the application definition downloaded at runtime from DCDB 264. In such an embodiment, copying step 348 would be eliminated.

An embodiment of the present invention may provide for a user initiated refresh of the desktop, and if, in step 352, no application is launched, build method 342 then determines if a refresh of the desktop has been requested in step 356. If a refresh has been requested, launch method 342 returns to step 346. Otherwise, build method 342 loops back to step 352.

Thus, desktop build method 342 provides a user-specific desktop independent of which of clients 108–112 the user logs onto. Moreover, a system administration need not do a local installation of user-specific services on client processors 108–112, and application updates are managed globally as well.

Although the present invention and its advantages have been described in detail, it should be understood that various changes, substitutions and alterations can be made herein without departing from the spirit and scope of the invention as defined by the appended claims.

What is claimed is:

1. A method of applications management comprising the steps of:
    creating an application definition for a multiuser application;
    associating said application definition with one or more users; and
    building a desktop workspace corresponding to said user in response to each logon by said user, said desktop workspace including a representation of said multiuser application.

2. The method of claim 1 wherein said step of creating said application definition comprises the steps of:
    receiving an application identifier of said application; and
    receiving a set of mandatory parameters associated with said application.

3. The method of claim 1 wherein said step of creating said application definition comprises the step of receiving a set of optional parameters associated with said application.

4. The method of claim 3 wherein said step of creating said application definition further comprises the step of, if a member of said set of optional parameters is overridable by said user, setting a user override flag corresponding to said member.

5. The method of claim 1 wherein said step of creating an application definition further comprises the step of creating a domain controller database entry corresponding to said application definition.

6. The method of claim 1 wherein said step of associating said application definition with one or more users comprises the steps of:
    opening a user list;
    opening an application definition list including said application definition;
    selecting said at least one or more users from said user list; and
    selecting said application definition.

7. The method of claim 6 wherein said step of associating said application definition further comprises, if said application definition includes a user overridable parameter, the steps of:
    prompting for a user override value; and
    entering a user override value in response to said prompting step.

8. The method of claim 7 wherein said step of associating said application definition further comprises the step of storing said user override value in a domain controller database.

9. The method of claim 1 wherein said step of building a desktop workspace comprises the steps of:
    invoking a desktop builder in response to a user logon;
    retrieving a portion of a domain controller database corresponding to application definitions associated with said user by said desktop builder; and
    creating a local copy of said portion.

10. The method of claim 9 wherein said steps of invoking said desktop builder, retrieving a portion of said database, and creating a local copy of said portion are executed in response to a refresh command.

11. The method of claim 1 wherein said desktop workspace corresponding to said user is independent of a data processor providing said each logon.

12. The method of claim 1 wherein said step of building a desktop workspace comprises the steps of:
   invoking a desktop builder in response to a user logon; and
   retrieving a portion of a domain controller database corresponding to application definitions associated with said user by said desktop builder.

13. The method of claim 12 further comprising the steps of:
   launching an application corresponding to a preselected one of said application definitions; and
   dynamically configuring an application run time environment of said application according to one or more application parameters in said preselected one of said application definitions.

14. The method of claim 13 wherein said one or more application parameters comprise at least one environment variable.

15. A data processing system for applications management comprising:
   a domain controller operable for coupling to a network, said domain controller including:
      circuitry operable for creating an application definition for a multiuser application; and
      circuitry operable for associating said application definition with one or more users; and
   at least one client processor coupled to said network, said at least one client processor including circuitry for building a desktop workspace corresponding to said user in response to each logon by said user, said desktop workspace including a representation of said multiuser application.

16. The data processing system of claim 15 wherein said circuitry for creating said application definition comprises:
   circuitry for receiving an application identifier of said application; and
   circuitry for receiving a set of mandatory parameters associated with said application.

17. The data processing system of claim 15 wherein said circuitry for creating said application definition comprises circuitry for receiving a set of optional parameters associated with said application.

18. The data processing system of claim 17 wherein said circuitry for creating said application definition further comprises circuitry for, if a member of said set of optional parameters is overridable by said user, setting a user override flag corresponding to said member.

19. The data processing system of claim 15 wherein said circuitry for creating an application definition further comprises circuitry for creating a domain controller database entry corresponding to said application definition.

20. The data processing system of claim 15 wherein said circuitry for associating said application definition with one or more users comprises:
   circuitry for opening a user list;
   circuitry for opening an application definition list including said application definition
   circuitry for selecting said at least one or more users from said user list; and
   circuitry for selecting said application definition.

21. The data processing system of claim 20 wherein said circuitry for associating said application definition further comprises:
   circuitry for, if said application definition includes a user overridable parameter, prompting for a user override value; and
   circuitry for entering a user override value in response to said prompting step.

22. The data processing system of claim 21 wherein said circuitry for associating said application definition further comprises circuitry for storing said user override value in a domain controller database.

23. The data processing system of claim 15 wherein said circuitry for building a desktop workspace comprises:
   circuitry for invoking a desktop builder in response to a user logon;
   circuitry for retrieving a portion of a domain controller database corresponding to application definitions associated with said user by said desktop builder; and
   circuitry for creating a local copy of said portion.

24. The data processing system of claim 23 further comprising circuitry for invoking said desktop builder, retrieving a portion of said database, and creating a local copy of said portion repeated in response to a refresh command.

25. The data processing system of claim 15 wherein said desktop workspace corresponding to said user is independent of a client processor providing said each logon.

26. The data processing system of claim 15 wherein said circuitry for building a desktop workspace comprises:
   circuitry for invoking a desktop builder in response to a user logon; and
   circuitry for retrieving a portion of a domain controller database corresponding to application definitions associated with said user by said desktop builder.

27. The data processing system of claim 26 wherein said at least one client processor further comprises:
   circuitry for launching an application corresponding to a preselected one of said application definitions; and
   circuitry for dynamically configuring an application run time environment of said application according to one or more application parameters in said preselected one of said application definitions.

28. The data processing system of claim 27 wherein said one or more application parameters comprises an environment variable.

29. A computer program product operable for storage on computer readable media, said program product for applications management comprising:
   programming operable for creating an application definition for a multiuser application;
   programming operable for associating said application definition with one or more users; and
   programming for building a desktop workspace corresponding to said user in response to each logon by said user, said desktop workspace including a representation of said logon user application.

30. The computer program product of claim 29 wherein said programming for creating said application definition comprises:
   programming for receiving an application identifier of said application; and
   programming for receiving a set of mandatory parameters associated with said application.

31. The computer program product of claim 29 wherein said programming for creating said application definition comprises programming for receiving a set of optional parameters associated with said application.

32. The computer program product of claim 31 wherein said programming for creating said application definition further comprises programming for, if a member of said set of optional parameters is overridable by said user, setting a user override flag corresponding to said member.

33. The computer program product of claim 29 wherein said programming for creating an application definition further comprises programming for creating a domain controller database entry corresponding to said application definition.

34. The computer program product of claim 29 wherein said programming for associating said application definition with one or more users comprises:

programming for opening a user list;

programming for opening an application definition list including said application definition programming for selecting said at least one or more users from said user list; and programming for selecting said application definition.

35. The program product of claim 34 wherein said programming for associating said application definition further comprises:

programming for, if said application definition includes a user overridable parameter, prompting for a user override value; and programming for entering a user override value in response to said prompting step.

36. The program product of claim 35 wherein said programming for associating said application definition further comprises programming for storing said user override value in a domain controller database.

37. The program product of claim 29 wherein said programming for building a desktop workspace comprises:

programming for invoking a desktop builder in response to a user logon;

programming for retrieving a portion of a domain controller database corresponding to application definitions associated with said user by said desktop builder; and programming for creating a local copy of said portion.

38. The program product of claim 37 further comprising programming for invoking said desktop builder, retrieving a portion of said database, and creating a local copy of said portion repeated in response to a refresh command.

39. The program product of claim 29 wherein said desktop workspace is independent of a client processor providing said each logon.

40. The program product of claim 29 wherein said programming for building a desktop workspace comprises:

programming for invoking a desktop builder in response to a user logon; and programming for retrieving a portion of a domain controller database corresponding to application definitions associated with aid user by said desktop builder.

41. The program product of claim 40 further comprising:

programming for launching an application corresponding to a preselected one of said application definitions; and programming for dynamically configuring an application run time environment of said application according to one or more application parameters in said preselected one of said application definitions.

42. The program product of claim 41 wherein said one or more application parameters comprise at least one environment variable.

* * * * *